Feb. 12, 1924.
J. H. CLOYES
1,483,076
FOLDING TOP FOR VEHICLES AND OTHER STRUCTURES
Filed Oct. 8, 1913
2 Sheets-Sheet 1
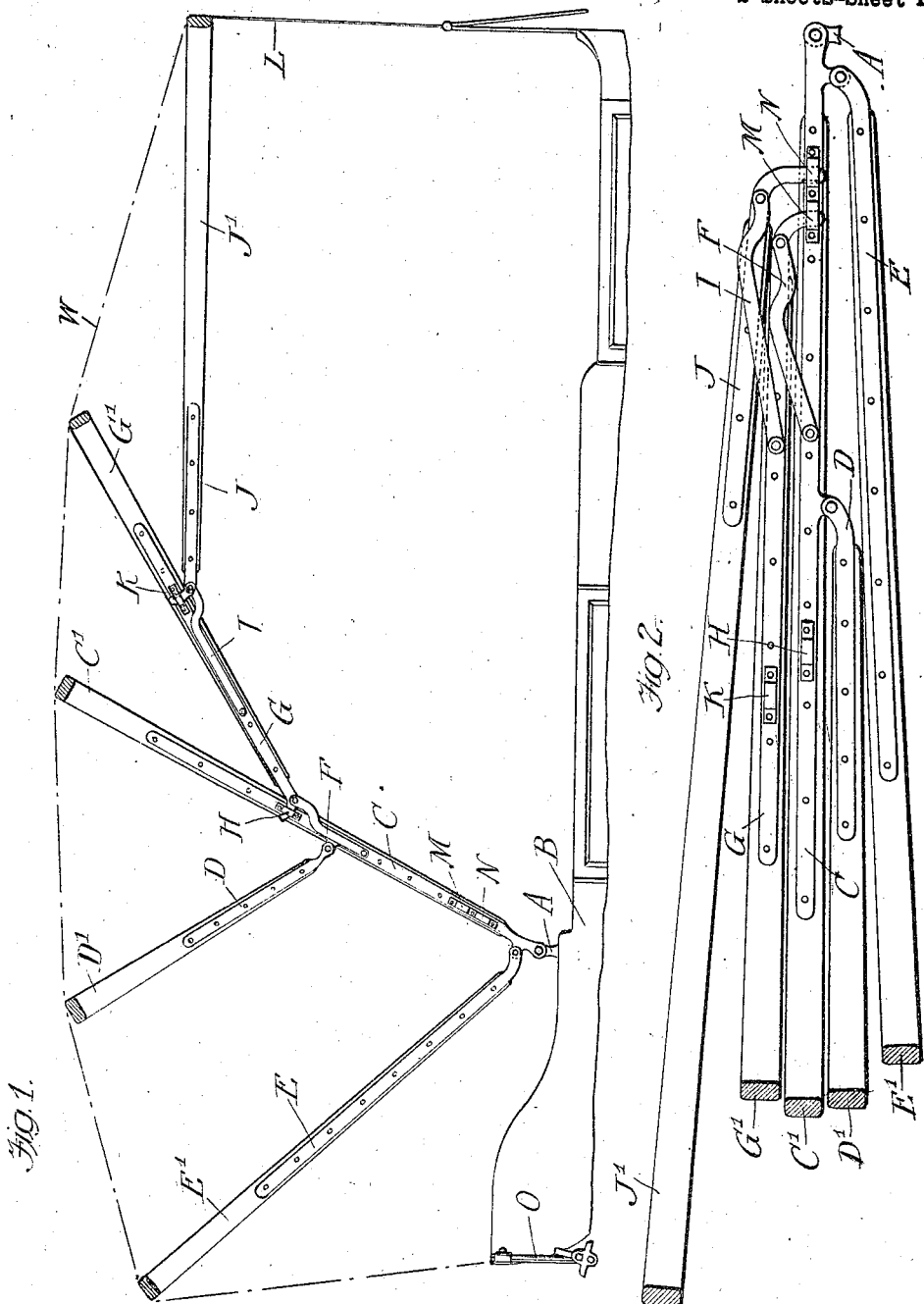

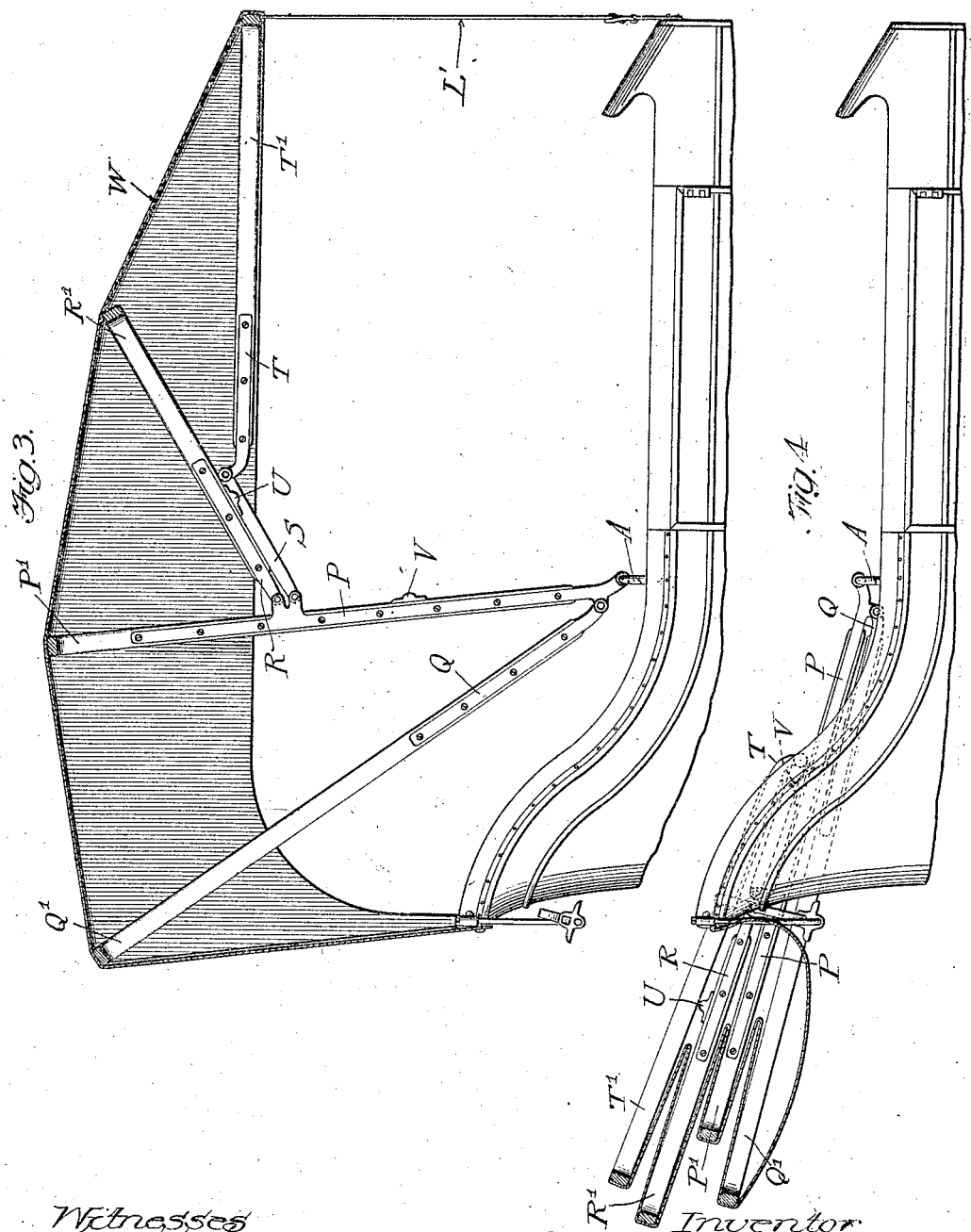

Patented Feb. 12, 1924.

1,483,076

UNITED STATES PATENT OFFICE.

JAMES H. CLOYES, OF CHICAGO, ILLINOIS, ASSIGNOR, BY MESNE ASSIGNMENTS, TO THE ASHTABULA BOW SOCKET COMPANY, OF ASHTABULA, OHIO, A CORPORATION OF OHIO.

FOLDING TOP FOR VEHICLES AND OTHER STRUCTURES.

Application filed October 8, 1913. Serial No. 794,032.

*To all whom it may concern:*

Be it known that I, JAMES H. CLOYES, a citizen of the United States, residing at Chicago, in the county of Cook and State of Illinois, have invented certain new and useful Improvements in Folding Tops for Vehicles and Other Structures, of which the following is a description, reference being had to the accompanying drawings, forming a part of this specification.

My invention relates more particularly to the construction and arrangement of the bows by which the cloth or pliable material forming the weather shield is supported above the vehicle when the top is opened or extended, and which may be folded rearwardly in compact form when the top is lowered. By the novel arrangement and pivoting of these bows the forward bow of the top may readily be made to extend a considerable distance forward of the point of support of the bow structure, while the forward side and top members are out of the way and form no hindrance or obstruction to the view from inside the vehicle, or obstacle in getting into and out of it. The construction is moreover such that a front windshield and side curtains may be attached to the top with the greatest facility, so as to completely enclose the interior of the vehicle in case of cold or stormy weather. The rails, top and side joints, and props commonly used on buggy, carriage and automobile tops are unnecessary where my invention is employed and may be entirely dispensed with. The object of my invention is to provide a simple, yet strong, efficient and practical vehicle top having the characteristics and advantages mentioned.

In the drawings Fig. 1 is a side view showing my invention in a preferred form as embodied in a frame for a vehicle top suitable for an automobile; Fig. 2 is a side view of said frame in closed or folded position; Fig. 3 is a side view, partly in elevation and partly in section, of a simpler form of construction showing the upper portion of a buggy carrying a top in extended position; and Fig. 4 is a similar view showing the top closed.

The same letters of reference indicate the same parts in the different views.

Referring first to the form of my invention illustrated in Figs. 1 and 2, the entire bow structure is pivotally supported upon brackets A fixed upon opposite sides of the body B of the vehicle. In the present instance the bow members are composed of pairs of opposite slat irons, to which by bolts or other suitable means are secured the side portions of U-shaped wooden bows constituting the support for the fabric of the windshield. It is of course evident, however, that the bows may be made entirely of metal and each member made integral if desired.

The main bow, consisting of the slat irons C and the bow C' is pivoted at its opposite ends to the bracket A, and in the present instance there are pivoted upon the slat irons of the main bow, near their centers and their lower ends, two rear bows made up of the slat irons D and bow D' and the slat irons E and the bow E', respectively. However, a varying number of rear bows may be employed and they may be pivoted either upon the main bow, or upon the bracket A, or a separate pivot adjacent that bracket, if desired. Upon the slat irons C of the main bow, and at an intermediate point in their length, are pivoted the inner ends of two links F, one upon each of said slat irons at the opposite sides of the bow structure. To the outer ends of these links are pivoted slat irons G, to which the side members of a short forwardly extending bow G' are secured, the structure as a whole constituting an articulated auxiliary or intermediate bow. These slat irons are curved upwardly at their rear ends so as to engage sockets formed by short straps H secured to the slat irons C of the main bow before mentioned when the frame structure and top is raised. Intermediate the length of the slat irons G of the forwardly extending bow just described are pivoted a second pair of links I, to which in turn are pivoted slat irons J to which are secured the side members of a substantially horizontal front bow J', the structure as a whole here constituting an articulated outrigger bow. The inner or rear ends of these slat irons J are likewise curved to engage sockets K upon the slat irons G, similar to the sockets H before mentioned, and the shape and relations of the curved and notched ends of the slat irons J and the socket K are such that the slat irons hook around the front wall of the socket when the parts are in the position shown in Fig. 1, and cannot be disengaged until the bow J' is swung upon its pivots so as to lie approximately parallel to the bow G'.

The sockets K, upon the slat irons G, by thus engaging with the inner or rear ends of said slat irons J, prevent in the raised or extended condition of the top, the upward breaking of the elbow in the side bars of the front or articulated outrigger bow, as will be readily apparent (see Figure 1). By reason, however, of the elbows thus formed in the jointed side bars of the front or outrigger bow, the latter, when the top is raised, tends to remain in position, it requiring some effort, even though slight, on the part of the operator to break the joint downwardly, preparatory to folding up the top.

The flexible material W (shown in dotted outline in Fig. 1) which forms the weather shield of the top, is usually a durable water proof cloth of proper shape and size to be tightly stretched by the folding bow structure just described when the same is in raised or open position, being secured at its rear to the body of the vehicle and at its lines of contact to the cross portions of the bows. Straps L, preferably two in number, attached to the front bow near the sides thereof and arranged to be fastened to the body of the vehicle below said front bow, are provided to secure and hold the top in raised position. It is evident that when the straps L are drawn taut the resultant strain upon the bow structure and the fabric of the top will produce a rearward thrust upon the front bow J' tending to support the bow G', and a similar effect will be produced upon the main bow C', the result being to hold the top securely in raised postition.

In the raised or extended condition of the top, it will be observed that the inner curved ends of the slat-irons J, by engaging with the sockets K upon the slat irons G, effectively prevent further upward bending of the pivot joints between said slat-irons, or, in other words, further movement of the bow J' relative to the links I. It will also be observed that the combined length of said bow J, link I and that portion of slat-iron G lying between the point of attachment of said link thereto and the point of attachment or support of said slat-iron G on the main bow, is greater than the distance between said bow J' and said main bow. Accordingly, when the members in question are sprung or moved upwardly into the position shown in Fig. 1, they form a supporting arch, the locking engagement between the curved rear ends of slat-irons J and the sockets K serving just as would a rule joint to prevent such arch from bending upwardly beyond the desired point. Furthermore, the joint in question is well up within the top, while the point of attachment of slat-iron G to the main bow is below the top so that the sides of the latter will cooperate with the straps L to hold the top in a taut firm condition, and prevent the breaking of the joint between slat-iron J and link I, except when the top is released as an incident to the folding operation.

Assuming the top to be raised, when it is desired to lower it the straps L are unfastened, the links F are swung on the pivots at their inner ends so that they will lie adjacent the bow C', and bow G' folded to lie parallel with the bow C', in which position the curved end of the slat iron G will enter a socket M provided for it on the slat iron C similar to the sockets H and K before mentioned. The bow J' may now be lifted so as to disengage the hooked end of the slat iron G, and the links I swung on their pivots and also brought substantially parallel to the main bow C', and the bow J' folded in a manner similar to that just described, the curved ends of the slat irons J entering sockets N adjacent to the sockets M on the slat irons C of the main bow. All the bows thus far described are then swung rearwardly and brought together in approximately parallel relation to the rear bows, and the entire top is lowered to its position of rest in the top rest O fixed to the rear of the vehicle body.

In the form of my improved top under consideration, it will be evident that the short forwardly extending bow G' which is carried by the slat-irons G clear of and wholly forward of the main bow C' and of the point of attachment of said slat-irons to said main bow, constitutes merely an intermediate support for the cover between said main bow and the forward or outrigger bow J'. While the slat-irons G, links I and slat-irons J, in combination with the bow J', constitute an independent upstanding supporting arch, as hereinbefore explained, this intermediate bow G', by virtue of its attachment to slat-irons G, serves to transmit a portion of the load developed by the tension of the cover to the members forming the arch structure in question, and thus to a corresponding extent lessens the strain on the locked joint between link I and slat-iron J. It will also be seen that the forward or outrigger bow J' stands in the relation of an auxiliary to the main bow from which it is supported, and that, in the described relation of the intermediate or supplement bow G' as it may be termed, in which it transmits to the upwardly arched side members the load developed by the tension of the cover, the front and rear portions of the outrigger or auxiliary bow considered as a whole constitute the compression member, while such intermediate or supplemental bow constitutes the strut, and the cover material provides the tension member of a rigid truss supporting the forward end of the top covering.

Referring now to Figs. 3 and 4 of the drawings, my invention is there illustrated in a more simple form as applied to a vehicle body which is well adapted for use as a top buggy, though of an original design constructed somewhat on the lines of certain types of automobiles. Specific claims to this construction have been required to be divided out, and so are found in my co-pending application filed Sept. 24, 1917, Serial No. 192,934.

In this construction the main bow, consisting of the slat irons P and the bow P', is pivoted to the brackets A, and upon this main bow is pivoted a rear bow made up of the slat irons Q and bow Q'. A shorter bow, consisting of slat irons R and bow R' is pivoted intermediate the length of the slat irons P of the main bow, and immediately below the pivotal bearings of such short bow are pivoted the inner ends of links S. To the outer end of these links S are pivoted the slat irons T, to which the ends of the front bow T' are secured such bow in combination with said links, constituting as before an articulated outrigger bow. Suitable seats U are secured upon the front of the side portions of the short intermediate bow R' to receive the links S when the top is in raised position and secure the links against lateral displacement as also prevent upward breaking of the elbows formed by the jointed side-bars of the front or outrigger bow, when the top is raised or extended. In other words, the same result is secured by these means as is obtained by the engagement of the inner or rear ends of slat irons J with the sockets K in the first-described construction, that illustrated in Figures 1 and 2. Similar seats V are secured upon the front of the main bow to hold the links in place when the bow structure is closed or folded. Straps L' attached to the front bow and adapted to be secured to the body of the vehicle are provided as in the case of the preferred form of my invention hereinbefore described, and the top is erected, or lowered, in similar manner, the covering material W' being here shown in full lines so as to indicate the extent to which such covering hides the outrigger bow and associated parts of the top supporting structure.

I claim:

1. In a vehicle top, the combination with a main bow pivotally attached to the vehicle body, of an articulated outrigger bow supported from said main bow intermediate the base and top thereof so as to be foldable into substantially parallel relation therewith, and means independent of the joints of said outrigger bow adapted to limit the amount of bending at such joints past the center, when the top is extended, to a point where an upstanding arched structure is formed.

2. In a vehicle top, the combination with a main bow pivotally attached to the vehicle body, of an articulated outrigger bow and an intermediate bow supported from said main bow intermediate the base and top thereof, said intermediate bow being adapted to limit the amount of bending at the joints of said outrigger bow past the center, when the top is extended, to a point where an upstanding arched structure is formed.

3. In a vehicle top, the combination with a main bow pivotally attached to the vehicle body, of an articulated outrigger bow and an intermediate bow supported from said main bow intermediate the base and top thereof, said outrigger bow being adapted to form an upstanding arch, when the top is extended, and means on said intermediate bow for bearing on said outrigger bow, in such extended condition of the top.

4. In a vehicle top, the combination with a main bow pivotally attached to the vehicle body, of an articulated outrigger bow and an intermediate bow supported from said main bow intermediate the base and top thereof so as to be foldable into substantially parallel relation therewith, the joints in said outrigger bow forming upwardly directed elbows when the top is extended and said intermediate bow being adapted to limit the amount of bending at such joints past the center, in such extended condition of the top, to a point where an upstanding arched structure is formed.

5. In a vehicle top, the combination with a main bow pivotally attached to the vehicle body, of an articulated outrigger bow and an intermediate bow supported from said main bow intermediate the base and top thereof so as to be foldable into substantially parallel relation therewith, the joints in said outrigger bow forming an upstanding arched structure when the top is extended, and means on said intermediate bow for bearing on said outrigger bow, in such extended condition of the top.

6. In a frame for supporting a vehicle top, the combination with a main bow, of a forwardly and upwardly extending bow having a shiftable pivotal connection with said main bow, a pair of pivoted links arranged to be raised into parallel relation with said forwardly extending bow, and a substantially horizontal front bow pivoted to said links and arranged to engage with said forwardly extending bow, when said links are thus raised.

7. In a frame for supporting a vehicle top, the combination with a main bow, of a forwardly and upwardly extending bow having an oscillatory pivotal connection with said main bow, a pair of pivoted links arranged to be raised into parallel relation with said forwardly extending bow, and a substantially horizontal front bow pivoted to said links and arranged to engage with said forwardly extending bow, when said links are thus raised.

8. In a frame for supporting a vehicle top, the combination with a main bow pivotally attached to the vehicle body, of a forwardly and upwardly extending bow having a pivotal connection with said main bow at a point intermediate the base and top of the latter, a pair of links pivoted to said forwardly extending bow and arranged to be raised into parallel relation therewith, and a substantially horizontal front bow pivoted to said links and arranged to engage with said forwardly extending bow, when said links are thus raised.

9. In a frame for supporting a vehicle top, the combination with a main bow, of a forwardly and upwardly extending bow having a shiftable pivotal connection with said main bow at points intermediate the base and top of the latter, a pair of links pivoted to such forwardly extending bow and arranged to be raised into parallel relation therewith; and a substantially horizontal front bow pivoted to said links and arranged to engage with said forwardly extending bow, when said links are thus raised.

10. In a frame for supporting a vehicle top, the combination with a main bow, of a forwardly and upwardly extending bow, a pair of links, said forwardly extending bow and pair of links being pivotally connected together and the one thereof having in turn a pivotal connection with said main bow at a point intermediate the base and top of the latter, and a substantially horizontal front bow pivoted to said links and arranged to engage with said forwardly extending bow, so as to limit the upward bending of the joints between said front bow and links.

11. In a frame for supporting a vehicle top, the combination with a main bow, of a forwardly and upwardly extending bow, a pair of links, said forwardly extending bow and pair of links being pivotally connected together and the one thereof having in turn a shiftable pivotal connection with said main bow at a point intermediate the base and top of the latter, and a substantially horizontal front bow pivoted to said links and arranged to engage with said forwardly extending bow, so as to limit the upward bending of the joints between said front bow and links.

12. In a frame for supporting a vehicle top, the combination with a main bow, of a forwardly and upwardly extending bow, a pair of links, said forwardly extending bow and pair of links being pivotally connected together and the one thereof having in turn an oscillatory pivotal connection with said main bow at a point intermediate the base and top of the latter, and a substantially horizontal front bow pivoted to said links and arranged to engage with said forwardly extending bow, so as to limit the upward bending of the joints between said front bow and links.

13. A folding vehicle top for vehicles comprising a pliable top fabric secured at its rear to the body of the vehicle, a collapsible frame including a main bow, a forwardly and upwardly extending bow pivotally connected with said main bow intermediate its base and top, a pair of links pivoted to said second bow, and a substantially horizontal front bow pivoted to said links and adapted to engage with said second bow, said top fabric being secured to said front and extending over the tops of the other bows, and means for securing said front bow in its extended position with said links in engagement with said second bow, whereby said frame is prevented from collapsing.

14. A folding vehicle top for vehicles comprising a pliable top fabric secured at its rear to the body of the vehicle, a collapsible frame including a main bow, a forwardly and upwardly extending bow pivotally connected with said main bow intermediate its base and top, a pair of links pivoted to said second bow, and a substantially horizontal front bow pivoted to said links and adapted to engage with said second bow, said top fabric being secured to said front and extending over the tops of the other bows, and tension means for drawing said front bow towards the vehicle body whereby said front bow is given a rearward thrust against said forwardly and upwardly extending bow and said links are held in engagement with said second bow.

15. In a vehicle top, the combination with a main bow suitably attached to the vehicle body; of an articulated forwardly inclined bow attached to said main bow; an articulated front bow attached to said inclined bow; and means independent of the joints in said front bow adapted to limit the amount of bending of such joints.

16. In a vehicle top, the combination with a main bow suitably attached to the vehicle body; of an articulated forwardly inclined bow attached to said main bow; and an articulated front bow attached to said inclined bow, the bending of the joint in said inclined bow in the extended condition of the top being limited by engagement with said main bow.

17. In a vehicle top, the combination with a main bow suitably attached to the vehicle body; of an articulated forwardly inclined bow attached to said main bow; and an articulated front bow attached to said inclined bow, the bending of the joints in said inclined and front bows in the extended condition of the top being limited by engagement of said bows with said main and inclined bows, respectively.

18. In a vehicle top, the combination with a main bow suitably attached to the vehicle body; of an articulated forwardly inclined bow; and an articulated front bow, one of said two last-named bows being pivotally attached to said main bow and the other being pivotally attached to said one, the portions of said front bow being adapted to form an upwardly extending elbow, and said inclined and front bows being adapted to interengage in the extended condition of the top so as to prevent upward breaking of such elbow.

19. In a vehicle top, the combination with a main bow suitably attached to the vehicle body; of an articulated forwardly inclined bow; a front bow; and a pair of links pivotally attached to the inner ends of said front bow, said inclined bow and said pair of links being pivotally connected together and the one thereof being in turn pivotally attached to said main bow, said front bow and links being adapted to form an upwardly extending elbow adapted to engage said inclined bow in the extended condition of the top so as to prevent upward breaking of such elbow.

20. A folding top for vehicles, comprising a pliable top fabric anchored at its rear end to the body of the vehicle and extending over and being attached to the bows of the frame, a main bow pivoted to the body of the vehicle, a pair of links freely pivoted to said main bow and adapted to lie parallel therewith in the extended condition of the top, a forwardly inclined bow pivoted to said links and adapted in such position to engage with said main bow, a second pair of links pivoted to said forwardly inclined bow and adapted to lie parallel therewith in such extended condition of the top, a front bow pivoted to said second pair of links and adapted in such position thereof to engage with said forwardly inclined bow, and means for connecting said front bow in its extended position to the front of the vehicle body.

21. A folding top for vehicles comprising a pliable top fabric anchored at its rear end to the body of the vehicle and extending over and being attached to the bows of the frame, a main bow pivoted to the body of the vehicle, a pair of links pivoted to said main bow, a forwardly inclined bow pivoted to said links, a second pair of links pivoted to said forwardly inclined bow, a front bow pivoted to said second pair of links, said front bow and forwardly inclined bow being formed to make interlocking engagement when the top is extended, and means for connecting said front bow in its extended position to the front of the vehicle body.

22. A folding top for vehicles comprising a pliable top fabric anchored at its rear end to the body of the vehicle and extending over and being attached to the bows of the frame, a main bow pivoted to the body of the vehicle, a pair of links pivoted to said main bow, a forwardly inclined bow pivoted to said links, a second pair of links pivoted to said forwardly inclined bow, a front bow pivoted to said second pair of links, said forwardly inclined bow being arranged to interlock with said main bow and said front bow to interlock with said forwardly inclined bow when the top is extended, and means for connecting said front bow in its extended position to the front of the vehicle body.

23. A folding top for vehicles comprising a pliable top fabric anchored at its rear end to the body of the sheltered structure and extending over and being attached to the bows of the frame, a main bow pivoted to the body and provided with an upper socket and a pair of lower sockets, a pair of links pivoted to said main bow, a forwardly inclined bow pivoted to said links and having a forward retaining socket and a curved rear end adapted to make engagement with the upper socket on said main bow when the top is extended, a second pair of links pivoted to said forwardly inclined bow, a front bow pivoted to said second pair of links and having a curved rear end adapted to make interlocking engagement with said socket on the forwardly inclined bow when the top is extended, said curved ends of the forwardly inclined bow and of the front bow being adapted to engage the uppermost and lowermost of the two lower sockets on the main bow when the top is folded, and means for connecting said front bow in its extended position to the front of the vehicle body.

24. A folding top for vehicles, comprising a pliable top fabric anchored at its rear end to the body of the vehicle and extending over and being secured to the bows of the frame, a rear bow pivoted at its lower end, a forwardly inclined main bow, a short rear bow pivoted intermediate the length of the main bow, a pair of links pivoted to swing forwardly at an intermediate point on said main bow and adapted to lie parallel therewith in the extended condition of the top, a forwardly inclined bow pivoted to said links and adapted in such position thereof to engage with said main bow, a second pair of links pivoted to said forwardly inclined bow and adapted to lie parallel therewith in such extended condition of the top, a substantially horizontal front bow pivoted to said second pair of links and adapted in such position thereof to engage with said forwardly inclined bow, and means for connecting said front bow in its extended position to the front of the vehicle body.

25. In a vehicle top, the combination with a front bow, of socket members carried thereby, a rear outrigger bow, links connecting said rear outrigger bow to said front bow whereby the ends of said rear outrigger bow can be seated in the socket members of said front bow, socket members carried by said rear outrigger bow, a front outrigger bow, links connecting said front outrigger bow to said rear outrigger bow whereby the ends of said front outrigger bow can be seated in the socket members of said rear outrigger bow, and means in connection with said socket members for retaining the ends of said front outrigger bow therein.

26. In a vehicle top, the combination with a front bow, of socket members carried thereby, a rear outrigger bow, links connecting said rear outrigger bow to said front bow whereby the ends of said rear outrigger bow can be seated in the socket members of said front bow, socket members carried by said rear outrigger bow, a front outrigger bow, links connecting said front outrigger bow to said rear outrigger bow whereby the ends of said front outrigger bow can be seated in the socket members of said rear outrigger bow.

JAMES H. CLOYES.

Witnesses:
LOUIS B. ERWIN,
ROBERT DOBBERMAN.